(12) United States Patent
Ishimine et al.

(10) Patent No.: US 7,346,913 B2
(45) Date of Patent: Mar. 18, 2008

(54) RACK MOUNT TYPE STORAGE UNIT ENABLING EASY ACCESS

(75) Inventors: Junichi Ishimine, Kawasaki (JP); Masahiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 10/991,196

(22) Filed: Nov. 17, 2004

(65) Prior Publication Data

US 2006/0010456 A1 Jan. 12, 2006

(30) Foreign Application Priority Data

Jul. 8, 2004 (JP) .............................. 2004-201722

(51) Int. Cl.
*G11B 17/03* (2006.01)
(52) U.S. Cl. ..................................... 720/600
(58) Field of Classification Search ................ 720/600; 360/92; 361/685, 687; 369/30.83; 710/214, 710/302
See application file for complete search history.

(56) References Cited

U.S. PATENT DOCUMENTS

| | | | |
|---|---|---|---|
| 5,195,022 A * | 3/1993 | Hoppal et al. ............... | 361/685 |
| 5,469,037 A | 11/1995 | McMurtrey, Sr. et al. | |
| 5,557,186 A | 9/1996 | McMurtrey, Sr. et al. | |
| 5,761,032 A * | 6/1998 | Jones ........................... | 361/685 |
| 6,327,113 B1 * | 12/2001 | Mueller et al. ............... | 360/92 |
| 6,480,379 B1 | 11/2002 | Dickey et al. | |
| 6,512,962 B2 * | 1/2003 | Dimitri et al. ............... | 700/214 |
| 6,600,703 B1 * | 7/2003 | Emberty et al. ............ | 369/30.83 |
| 6,957,291 B2 * | 10/2005 | Moon et al. ................. | 710/302 |
| 7,042,720 B1 * | 5/2006 | Konshak et al. ............. | 361/687 |
| 2003/0149840 A1 * | 8/2003 | Bolt et al. ................... | 711/114 |
| 2006/0010275 A1 * | 1/2006 | Moon et al. ................. | 710/302 |
| 2006/0132964 A1 * | 6/2006 | Lau et al. ..................... | 360/92 |

FOREIGN PATENT DOCUMENTS

| | | |
|---|---|---|
| JP | 2-79108 | 6/1990 |
| JP | 4-309293 | 10/1992 |
| JP | 8-137631 | 5/1996 |
| JP | 10-504417 | 4/1998 |
| JP | 2000-353883 | 12/2000 |
| JP | 2002-190688 | 7/2002 |
| JP | 2002-368461 | 12/2002 |
| JP | 2003-36669 | 2/2003 |
| JP | 2003-280823 | 10/2003 |
| WO | WO 95/34072 | 12/1995 |

* cited by examiner

*Primary Examiner*—Tianjie Chen
(74) *Attorney, Agent, or Firm*—Greer, Burns & Crain, Ltd.

(57) ABSTRACT

A support member is designed to move in the longitudinal direction in a rack mount type disk array apparatus. A frame member is attached to the support member for relative rotation around the rotation axis located between the front and rear ends of the frame member in the longitudinal direction. Recording disk drives are held within the frame member in an upright attitude. The recording disk drives can be removed from and inserted into the frame member in a facilitated manner. This leads to a facilitated replacement of the recording disk drives. Moreover, the upper face of the frame member is allowed to face forward through the rotation around the rotation axis. Even if the disk array apparatus is placed at a higher level, the operator easily accesses the recording disk drives in the frame member.

10 Claims, 5 Drawing Sheets

RACK MOUNT TYPE STORAGE UNIT ENABLING EASY ACCESS

BACKGROUND OF THE INVENTION

1. Field of the Invention

The present invention relates to a rack mount type storage unit. In particular, the invention relates to a rack mount type storage unit applicable to a rack mount type disk array apparatus.

2. Description of the Prior Art

A rack mount type disk array apparatus is well known. Hard disk drives (HDDs) are held in rows in a frame member of the disk array apparatus. A row of the HDDs is mounted on a corresponding single printed circuit board. The HDDs are kept in an attitude parallel to the bottom plate of the frame member. The HDDs are arranged in a direction perpendicular to the bottom plate of the frame member. When the HDD is replaced with new one, the frame member is pulled out from a rack in the horizontal direction. The printed circuit board is then taken out from the frame member along with the HDD to be replaced. The HDD is pulled off from the printed circuit board. A new HDD is then mounted on the printed circuit board. The printed circuit board is retuned to the frame member.

The aforementioned disk array apparatus only enables removal of a HDD along with a corresponding printed circuit board when the HDD is replaced with new one. The HDD cannot solely be removed from the frame member. The replacement of the HDDs is the troublesome operation. In addition, the disk array apparatus should normally keep operating without any discontinuance. The removal of the printed circuit board in the aforementioned manner causes discontinuance in the operation of the disk array apparatus. If the frame member rotates around a predetermined rotation axis in the disk array apparatus, removal and insertion of a HDD can be facilitated in a disk array apparatus located at a higher level.

SUMMARY OF THE INVENTION

It is accordingly an object of the present invention to provide a rack mount type disk array apparatus enabling a facilitated removal and/or insertion of a recording disk drive from and/or into a frame member. It is an object of the present invention to provide a rack mount type storage unit applicable to the rack mount type disk array apparatus.

According to the present invention, there is provided a rack mount type disk array apparatus comprising: a support member designed to move in the longitudinal direction; a frame member attached to the support member for relative rotation around a rotation axis located between the front and rear ends of the frame member in the longitudinal direction; and recording disk drives held within the frame member in an upright attitude.

The disk array apparatus enables storage of the recording disk drives in the upright attitude within the frame member. The recording disk drives can be removed from and inserted into the frame member in a facilitated manner. This leads to a facilitated replacement of the recording disk drives. Moreover, the frame member is attached to the support member for rotation around the rotation axis located between the front and rear ends of the frame member. The upper face of the frame member is allowed to face forward through the rotation around the rotation axis. Even if the disk array apparatus is placed at a higher level, the operator easily accesses the recording disk drives in the frame member.

Additionally, the rotation axis is located between the front and rear ends of the frame member. A first moment is generated around the rotation axis near the rear end based on the gravity, while a second moment is generate around the rotation axis near the front end based on the gravity. A weight distribution can be set over the frame member so as to balance the first moment with the second moment. The weight distribution enables an equal division of the total weight of the frame member and the recording disk drives over the area near the front end and the area near the rear end. This leads to a facilitated operation of changing the attitude of the frame member around the rotation axis with a smaller human power.

On the other hand, if the rotation axis is positioned at the rear end of the frame member, only a moment is generated around the rotation axis to lower the front end of the frame member based on the gravity. Unless the operator receives the full weight of the frame member and the recording disk drives, the frame member should rapidly rotate around the rotation axis. The frame member collides hard against a restraint member such as a stop. The recording disk drives will suffer from a hard impact or vibration. The recording disk drives may break down.

In this case, at least a row of the recording disk drives is placed between the rotation axis and the rear end. Likewise, the frame member may include: a first storage section defined in the frame member for receiving a row of the recording disk drives on the rotation axis; a second storage section defined in the frame member for receiving (n) rows of the recording disk drives between the first storage section and the rear end of the frame member; and a third storage section defined in the frame member for receiving (n+1) rows of the recording disk drives between the first storage section and the front end of the frame member.

A storage member may be fixed to the support member at the rear of the support member in the rack mount type disk array apparatus. The storage member may be designed to receive a power source unit at the rear of the frame member. A separate support of the power source unit enables reduction in the weight of the articles on the frame member. This ensures a facilitated operation of changing the attitude of the frame member around the rotation axis with a smaller human power.

The disk array apparatus may further comprise a restraint member designed to restrain a drop of the rear end around the rotation axis so as to keep the frame member in the horizontal attitude. Likewise, the disk array apparatus may further comprise an auxiliary restraint member designed to restrain a drop of the front end around the rotation axis so as to keep the frame member in a predetermined inclined attitude. The restraint member and the auxiliary restraint member serve to prevent an excessive rotation of the frame member. This helps the operator easily access the recording disk drives in the frame member.

The frame member may be equally trisected into a front section, an intermediate section and a rear section with a pair of parallel straight line parallel to the rotation axis along a horizontal plane including the rotation axis. In this case, the intermediate section includes the rotation axis.

As described above, a first moment is generated around the rotation axis near the rear end based on the gravity, while a second moment is generate around the rotation axis near the front end based on the gravity. A weight distribution can be set over the frame member so as to balance the first moment with the second moment. The weight distribution enables an equal division of the total weight of the frame member and the recording disk drives over the area near the front end and the area near the rear end. This leads to a facilitated operation of changing the attitude of the frame member around the rotation axis with a smaller human power.

A rack mount type storage unit may be utilized to realize the aforementioned rack mount type disk array apparatus. The storage unit may comprise: a support member designed to move in the longitudinal direction; and a frame member attached to the support member for relative rotation around a rotation axis located between the front and rear ends of the frame member in the longitudinal direction. The frame member may be equally trisected into a front section, an intermediate section and a rear section with a pair of parallel straight line parallel to the rotation axis along a horizontal plane including the rotation axis. The intermediate section includes the rotation axis.

A first moment is generated around the rotation axis near the rear end based on the gravity, while a second moment is generated around the rotation axis near the front end based on the gravity. A weight distribution can be set over the frame member so as to balance the first moment with the second moment. The weight distribution enables an equal division of the total weight of the frame member over the area near the front end and the area near the rear end. This leads to a facilitated operation of changing the attitude of the frame member around the rotation axis with a smaller human power.

The frame member may comprise: a first storage section defined between the rotation axis and the rear end for receiving an article; and a second storage section defined between the rotation axis and the front end for receiving an article over an area larger than that of the first storage section.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
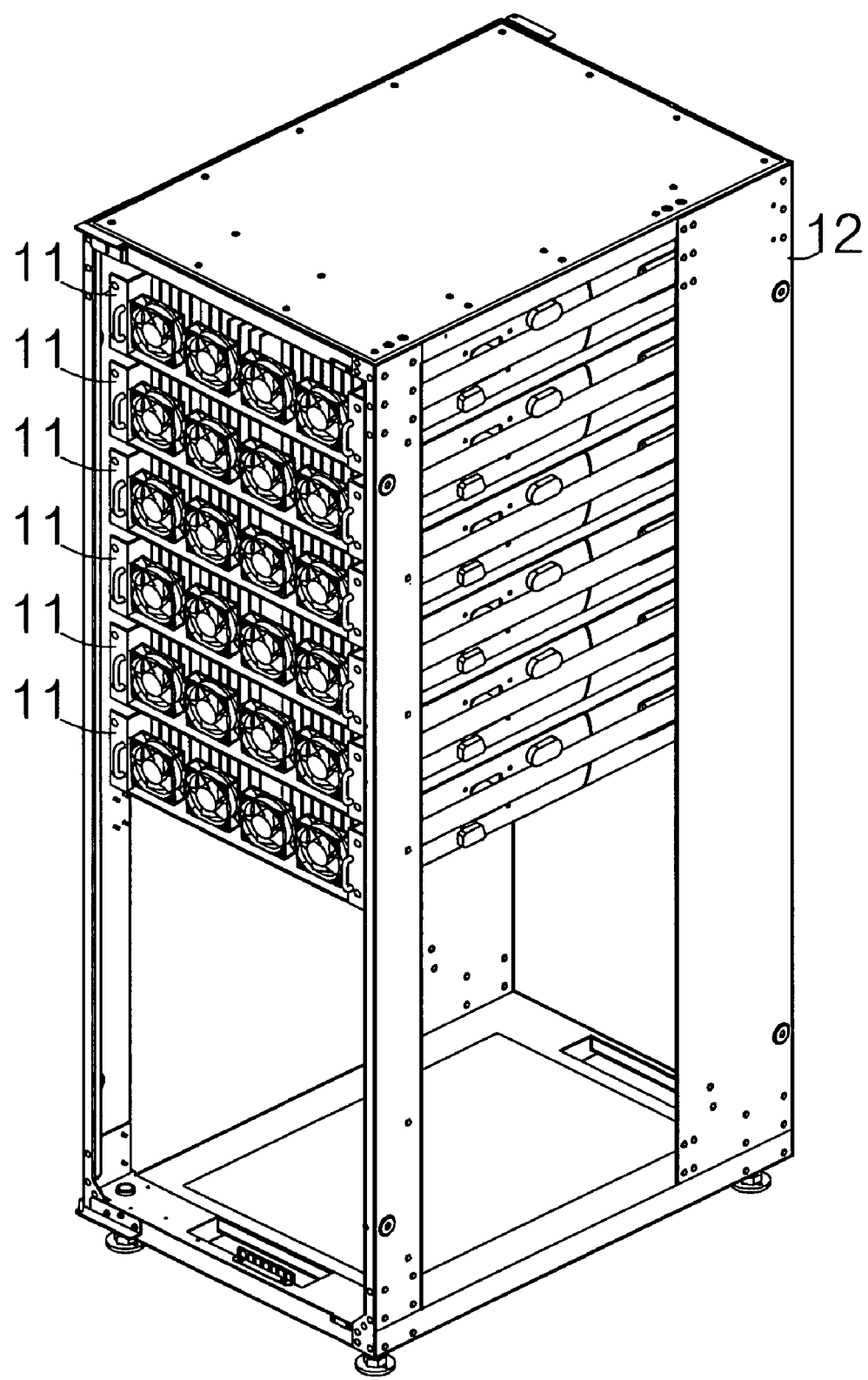
FIG. 1 is a perspective view illustrating a rack containing a rack mount type disk array apparatus according to a specific example of the present invention.

FIG. 1 schematically illustrates a rack 12 containing a rack mount type disk array apparatus 11 according to a specific embodiment of the present invention. The disk array apparatuses 11 are set in the rack 12. The disk array apparatuses 11 are connected to an upper host such as a server computer apparatus, not shown, likewise set in the rack 12. The disk array apparatuses 11 are allowed to operate based on instructions supplied from the server computer apparatus, for example.

Figure 2:
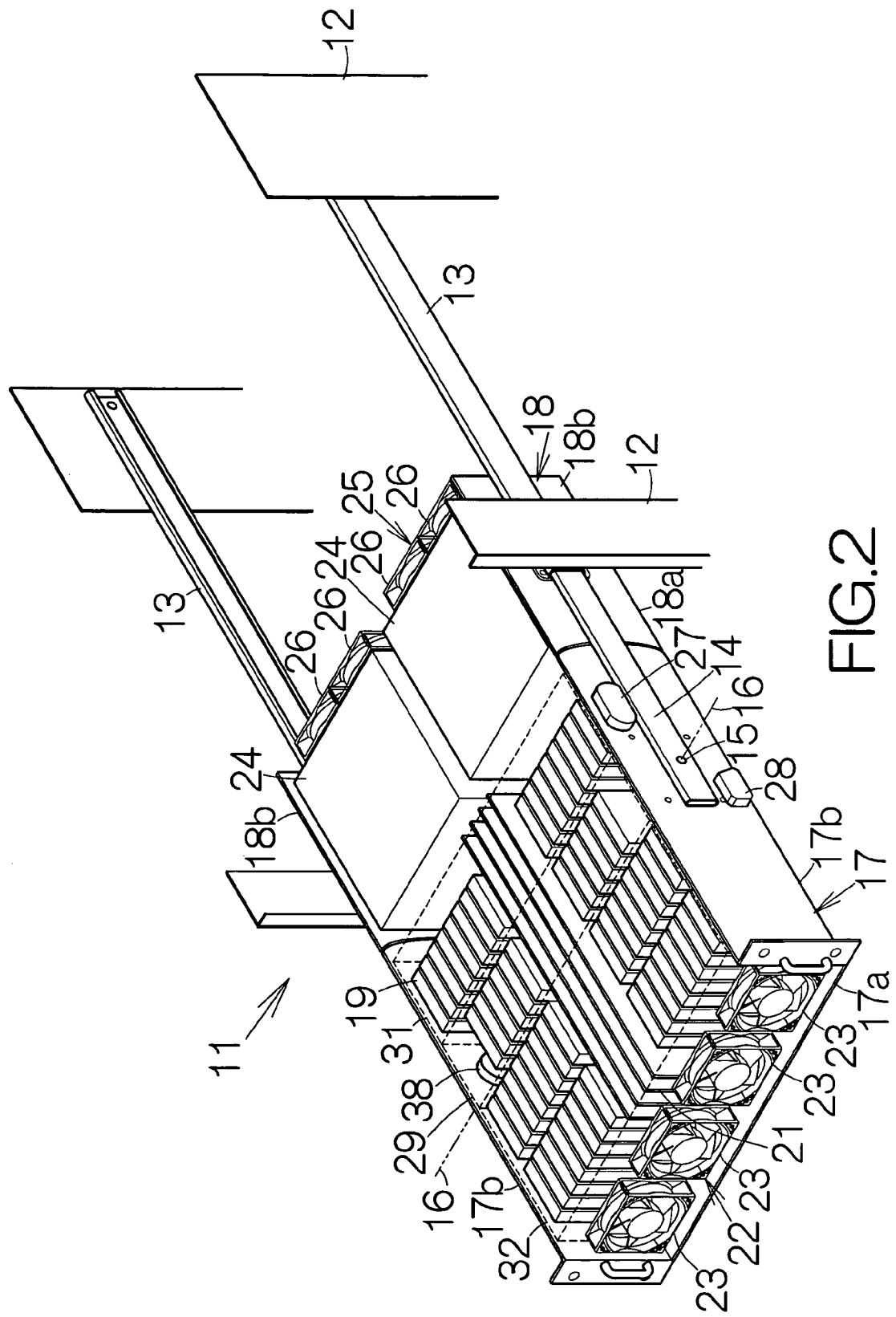
FIG. 2 is a perspective view schematically illustrating the structure of the disk array apparatus.

As shown in FIG. 2, a pair of guide member 13, 13 is fixed on the columns of the rack 12. The disk array apparatus 14 includes a pair of support member 14, 14. The support members 14, 14 are supported on the corresponding guide members 13, 13, respectively. The support member 14 is allowed to move in a longitudinal direction in the guide member 13. The guide members 13, 13 extend in parallel with each other. The support members 14, 14 thus extend in parallel with each other. The combination of the guide members 13 and the support members 14 enables the disk array apparatus 11 to be pulled out forward from the rack 12 in the horizontal direction.

Support shafts 15 are attached to the support members 14, respectively. A frame member 17 is attached to the support shafts 15 for relative rotation around a rotation axis 16. The rotation axis 16 corresponds to the axis of the support shaft 15. The frame member 17 includes a bottom plate 17a extending in the horizontal direction. Sidewalls 17b, 17b are placed at the side edges of the bottom plate 17a. The sidewalls 17a, 17b extend in the longitudinal direction. An inner space is defined between the sidewalls 17b, 17b. The support shafts 15 and the rotation axis 16 are located between the front and rear ends of the frame member 17. The support members 14 and the frame member 17 establish a rack mount type storage unit according to the present invention.

A storage member 18 is fixed to the support members 14 at the rear of the frame member 17. The storage member 18 includes a bottom plate 18a extending in the horizontal direction. Sidewalls 18b, 18b are placed at the side edges of the bottom plate 18a. The sidewalls 18b, 18b extend in the longitudinal direction. A storage space is defined between the sidewalls 18b, 18b. A predetermined space is defined between the rear end of the frame member 17 and the front end of the storage member 18 for allowing rotation of the frame member 17 around the support shafts 15.

Rows of recording disk drives or hard disk drives (HDDs) 19 are held within the inner space of the frame member 17. The individual HDD is kept in an upright or vertical attitude. Specifically, the rotation axis of a magnetic recording disk or hard disk is set in the horizontal attitude in the HDD. The upright attitude of the HDD 19 enables removal and insertion of the HDD 19 from and into the frame member 17 in the vertical direction. This facilitates replacement of the HDDs 19. Here, four rows of the HDDs 19 are arranged within the frame member 17. The HDDs 19 are arranged in parallel with the rotation axis 16 in each row.

Four interface boards 21 are mounted in the inner space of the frame member 17, for example. The interface boards 21 are kept in the upright or vertical attitude. The interface boards 21 receive from the server computer apparatus instructions of writing and reading. The interface boards 21 distribute the instructions to the corresponding individual HDDs 19 in response to the supplied instructions of writing and reading.

An air-intake unit 22 is mounted on the bottom plate 17a of the frame member 17. The air-intake unit 22 is designed to introduce the air into the frame member 17 from the front of the frame member 17. The air-intake unit 22 includes four ventilation fans 23, for example. The air-intake unit 22 serves to generate airflow directed to the inner space of the frame member 17 from the front of the frame member 17. The introduced air efficiently cools the HDDs 19 and the interface boards 21. An excessive rise in the temperature can thus be prevented in the HDDs 19 and the interface boards 21.

A pair of power source unit 24, 24 is held in the storage space within the storage member 18. The power source units 24 are received on the bottom plate 18a. Wires, not shown, are employed to connect the power source units 24 to the HDDs 19. The wires may extend through the inner space of the support member 14 to a printed circuit board in the frame member 17, for example. The printed circuit board will be described later in detail. The HDDs 19 are mounted on the printed circuit board. The power source units 24 serve to supply electric power to the individual HDDs 19.

A discharge unit 25 is mounted on the bottom plate 18a of the storage member 18 at the rear of the power source units 24. The discharge unit 25 is designed to discharge air from the back of the storage member 18. The discharge unit 25 includes four ventilation fans 26, for example. The discharge unit 25 serves to generate airflow flowing outward from the storage member 18. The airflow efficiently cools the power source units 24. An excessive rise in the temperature can thus be prevented in the power source units 24.

Restraint members 27 are fixed on the sidewalls 17b of the frame member 17, respectively. The restraint members 27 are allowed to contact the upper surfaces of the support members 14 when the frame member 17 takes the horizontal attitude. This contact prevents a drop of the rear end of the frame member 17 around the support shafts 15. Specifically, the rear end of the frame member 17 is prevented from dropping from the even level of the support shafts 15. The restraint members 27 serve to keep the frame member 17 in the horizontal attitude in this manner.

Auxiliary restraint members 28 are fixed on the sidewalls 17b of the frame member 17, respectively. The auxiliary restraint members 28 are allowed to contact the lower surfaces of the support members 14 when the frame member 17 takes a predetermined inclined attitude, as described later in detail. This contact prevents a further drop of the front end of the frame member 17 around the support shafts 15. Specifically, the front end of the frame member 17 is prevented from being further lowered. The auxiliary restraint members 28 serve to keep the frame member 17 in the predetermined inclined attitude. The restraint members 27 and the auxiliary restraint members 28 may be made of an elastic resin material such as a rubber, for example.

Figure 3:
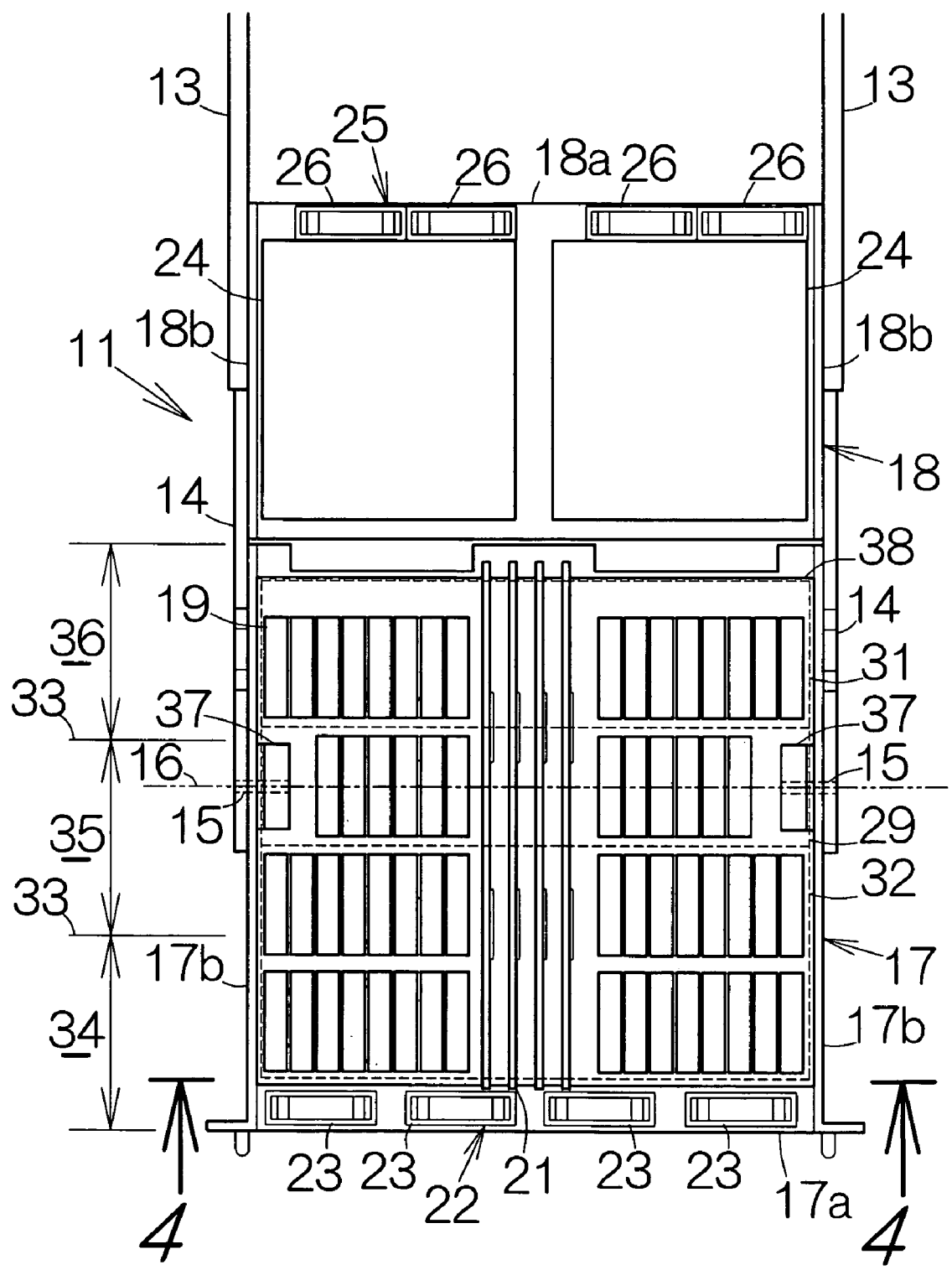
FIG. 3 is a plan view schematically illustrating the structure of the disk array apparatus.

Referring also to FIG. 3, first, second and third storage sections 29, 31, 32 are defined in the frame member 17. The first storage section 29 is defined on the rotation axis 16. The second storage section 31 is defined between the first storage section 29 and the rear end of the frame member 17. The third storage section 32 is defined between the first storage section 29 and the front end of the frame member 17. A row of articles or the HDDs 19 is received in the first storage section 29. At least a row of the HDDs 19 is received in the second storage section 31. Two rows of the HDDs 19 are received in the third storage section 32. The third storage section 32 has an area larger than that of the second storage section 31. Here, when (n) rows of the HDDs 19 are received in the second storage section 31, the third storage section 32 receives (n+1) rows of the HDDs 19. The frame member is equally trisected into a front section 34, an intermediate section 35, and a rear section 36 with a pair of parallel straight lines 33, 33 parallel to the rotation axis 16 along a horizontal plane including the rotation axis 16. In this case, the rotation axis 16 is positioned within the intermediate section 35.

As shown in FIG. 3, the support shafts 15 are supported on rotation dampers 37 inside the frame member 17, respectively. The rotation dampers 37 are fixed to the sidewalls 17b with screws, respectively, for example. The rotation dampers 37 may be a conventional one. A viscous fluid such as silicon oil is filled in the rotation dampers 37. The viscosity of the silicon oil serves to generate a damping in the rotation of the frame member 17. The rotation dampers 37 enable a moderate movement of the frame member 17 around the rotation axis 16.

Figure 4:
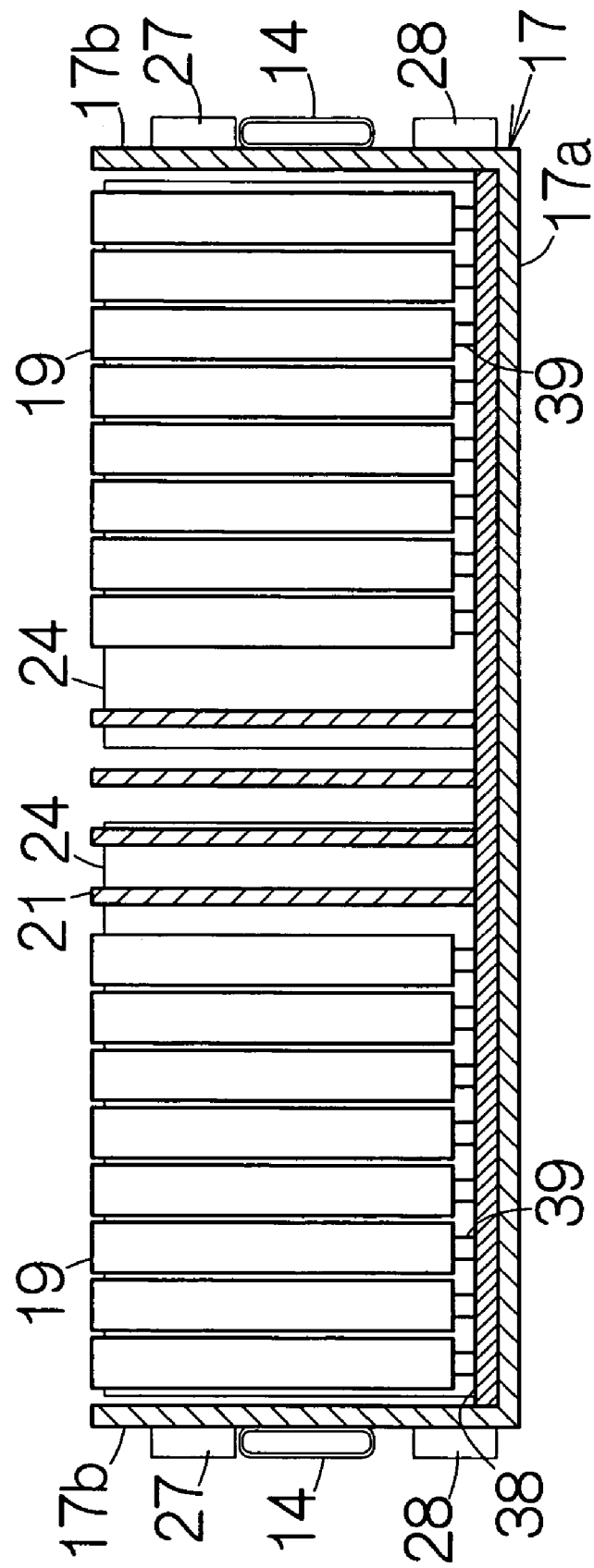
FIG. 4 is an enlarged sectional view taken along the line 4-4 in FIG. 3.

A printed circuit board 38 of a rectangular shape is received on the bottom plate 17a of the frame member 17 within the frame member 17. The aforementioned HDDs 19 and the interface boards 21 are mounted on the upper surface of the printed circuit board 38. As shown in FIG. 4, the individual HDD 19 includes a connector received on a connector 39 stationarily mounted on the upper surface of the printed circuit board 38. Electric connection can be established between the individual HDDs 19 and the printed circuit board 38 in this manner. The individual HDDs 19 can thus be inserted into and removed from the frame member 17 in the vertical direction.

Figure 5:
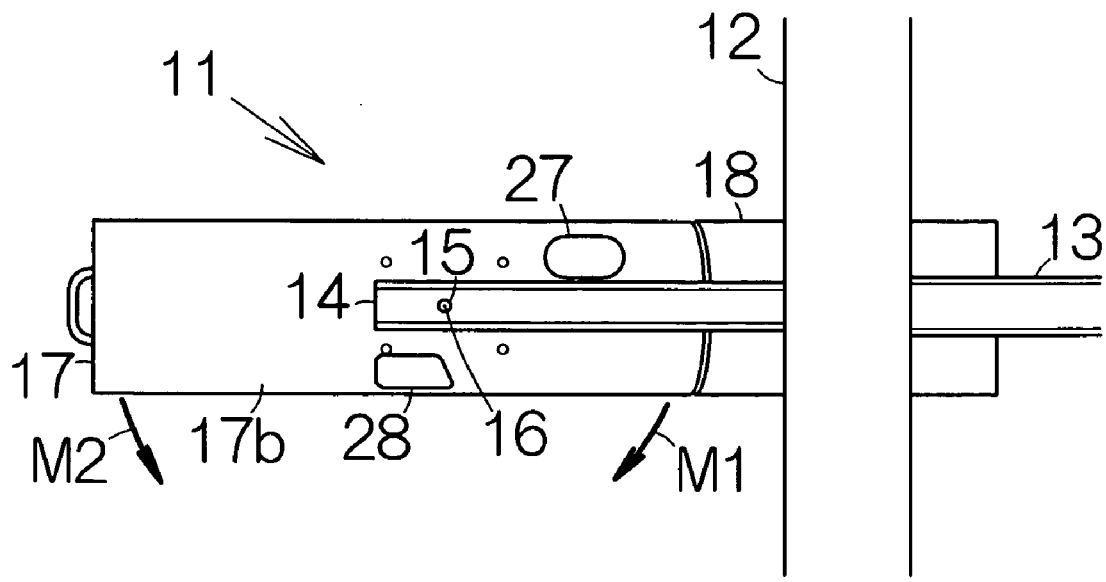
FIG. 5 is a side view schematically illustrating a frame member of the disk array apparatus in the horizontal attitude.

As shown in FIG. 5, a weight distribution is set over the frame member in the disk array apparatus 11 so as to balance first moment M1 with a second moment M2. The first moment M1 is generated around the rotation axis 16 near the rear end of the frame member 17 based on the gravity. The second moment M2 is likewise generated around the rotation axis 16 near the front end of the frame member 17 based on the gravity. The weight distribution enables an equal division of the total weight of the frame member 17 and the HDDs 19 over the area near the front end and the area near the rear end. This leads to a facilitated operation of changing the attitude of the frame member 17 around the rotation axis 16 with a smaller human power.

Figure 6:
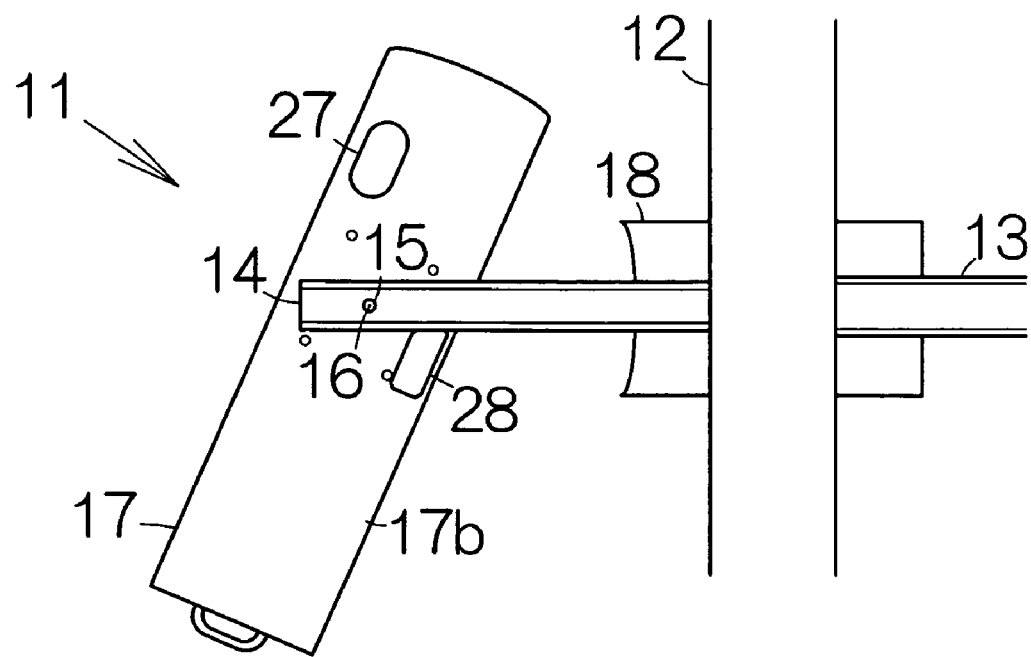
FIG. 6 is a side view schematically illustrating the frame member in a predetermined inclined attitude lowering the front end thereof.

As shown in FIG. 5, when any of the HDDs 19 is to be replaced with new one, the disk array apparatus 11 is pulled out forward from the rack 12 in the horizontal direction 12. The restraint member 27 reliably prevents the drop of the rear end around the rotation axis 16 from the even level. The operator then lowers the front end of the frame member 17 around the rotation axis 16. Since the weight distribution serves to balance the first moment M1 with the second moment M2 over the frame member 17, the operator is allowed to rotate the frame member 17 around the rotation axis 16 with a smaller human power. The rotation dampers 37 operate to moderate the rotation of the frame member 17. The auxiliary restraint members 28 on the frame member 17 are thus prevented from colliding hard against the support members 14. The HDDs 19 in operation can be prevented from receiving a hard impact or vibration. The frame member 17 is changed from the horizontal attitude to a predetermined inclined attitude lowering the front end, as shown in FIG. 6, for example. The frame member 17 of the inclined attitude allows the upper opening of the frame member 17 to face forward. The auxiliary restraint members 28 contact the lower surfaces of the support members 14. The auxiliary restraint members 28 serve to maintain the inclined attitude of the frame member 17.

The HDD 19 is then pulled off from the printed circuit board 38. The frame member 17 is kept in the inclined attitude lowering the front end. Even if the disk array apparatus 11 is placed at a higher level, the operator is allowed to easily access the HDDs 19 since the upper opening of the frame member 17 faces forward. The HDD 19 is easily pulled off from the frame member 17. A new HDD 19 is then mounted on the printed circuit board 38. The connector of the HDD 19 is inserted into the connector 39 on the printed circuit board 38. Even if the disk array apparatus 11 is placed at a higher level, the operator is allowed to easily insert the HDD 19 into the frame member 17.

The operator subsequently drives the frame member 17 around the rotation axis 16 so as to lift the front end of the frame member 17. As described above, since the weight distribution serves to balance the first moment M1 with the second moment M2 over the frame member 17, the operator is allowed to rotate the frame member 17 around the rotation axis 16 with a smaller human power. The rotation dampers 37 operate to moderate the rotation of the frame member 17. The restraint members 27 on the frame member 17 are thus prevented from colliding hard against the support members 14. The HDDs 19 in operation can be prevented from receiving a hard impact or vibration. The frame member 17 is changed from the inclined attitude to horizontal attitude. The restraint members 27 contact the upper surfaces of the support members 14. The restraint members 27 serve to keep the frame member 17 in the horizontal attitude. The disk array apparatus 11 is finally driven backward into the rack 12 in the horizontal direction. The replacement of the HDDs 19 is completed in the aforementioned manner.

The disk array apparatus 11 enables arrangement of the support shafts 15 or the rotation axis 16 between the front and rear ends of the frame member 17. In particular, the rotation axis 16 is positioned on the intermediate section 35. The first moment M1 to lower the rear end of the frame member can be balanced with the second moment M2 to lower the front end of the frame member 17. As compared with a conventional technique in which the rotation axis is positioned at the rear end of the frame member, the operator is allowed to change the attitude of the frame member 17 around the rotation axis 16 with a smaller human power.

The disk array apparatus 11 may include a locking mechanism to keep the frame member 17 in the horizontal attitude when the disk array apparatus 11 is pulled out from the rack 12. The locking mechanism may be attached to the rotation dampers 37, for example. The locking mechanism serves to prevent generation of unnecessary rotation of the frame member 17. The HDDs 19 can still reliably be prevented from a hard impact or vibration.

What is claimed is:

1. A rack mount type storage unit for holding disk drives comprising:
    a support member designed to move in a longitudinal direction; and
    a frame member attached to the support member for relative rotation around a rotation axis located between a front end and a rear end of the frame member in the longitudinal direction, wherein
    said frame member is equally trisected into a front section, an intermediate section and a rear section with a pair of parallel straight line parallel to the rotation axis along a horizontal plane including the rotation axis, said intermediate section including the rotation axis.

2. The rack mount type storage unit according to claim 1, wherein said frame member comprises:
    a first storage section defined between the rotation axis and the rear end for receiving an article; and
    a second storage section defined between the rotation axis and the front end for receiving an article over an area larger than that of the first storage section.

3. A rack mount type disk array apparatus comprising:
    a support member designed to move in a longitudinal direction;
    a frame member attached to the support member for relative rotation around a rotation axis located between a front end and a rear end of the frame member in the longitudinal direction; and
    recording disk drives held within the frame member in an upright attitude.

4. The rack mount type disk array apparatus according to claim 3, wherein at least a row of the recording disk drives is placed between the rotation axis and the rear end.

5. The rack mount type disk array apparatus according to claim 3, wherein a weight distribution is set over the frame member so as to balance a first moment with a second moment, said first moment generated around the rotation axis near the rear end based on gravity, said second moment generated around the rotation axis near the front end based on the gravity.

6. The rack mount type disk array apparatus according to claim 3, wherein said frame member comprises:
    a first storage section defined in the frame member for receiving a row of the recording disk drives on the rotation axis;
    a second storage section defined in the frame member for receiving (n) rows of the recording disk drives between the first storage section and the rear end of the frame member; and
    a third storage section defined in the frame member for receiving (n+1) rows of the recording disk drives between the first storage section and the front end of the frame member.

7. The rack mount type disk array apparatus according to claim 3, wherein a storage member is fixed to the support member for receiving a power source unit at the rear of the frame member.

8. The rack mount type disk array apparatus according to claim 3, further comprising a restraint member designed to restrain a drop of the rear end around the rotation axis so as to keep the frame member in a horizontal attitude.

9. The rack mount type disk array apparatus according to claim 3, further comprising an auxiliary restraint member designed to restrain a drop of the front end around the rotation axis so as to keep the frame member in a predetermined inclined attitude.

10. The rack mount type disk array apparatus according to claim 3, wherein said frame member is equally trisected into a front section, an intermediate section and a rear section with a pair of parallel straight line parallel to the rotation axis along a horizontal plane including the rotation axis, said intermediate section including the rotation axis.

* * * * *